Patented June 25, 1929.

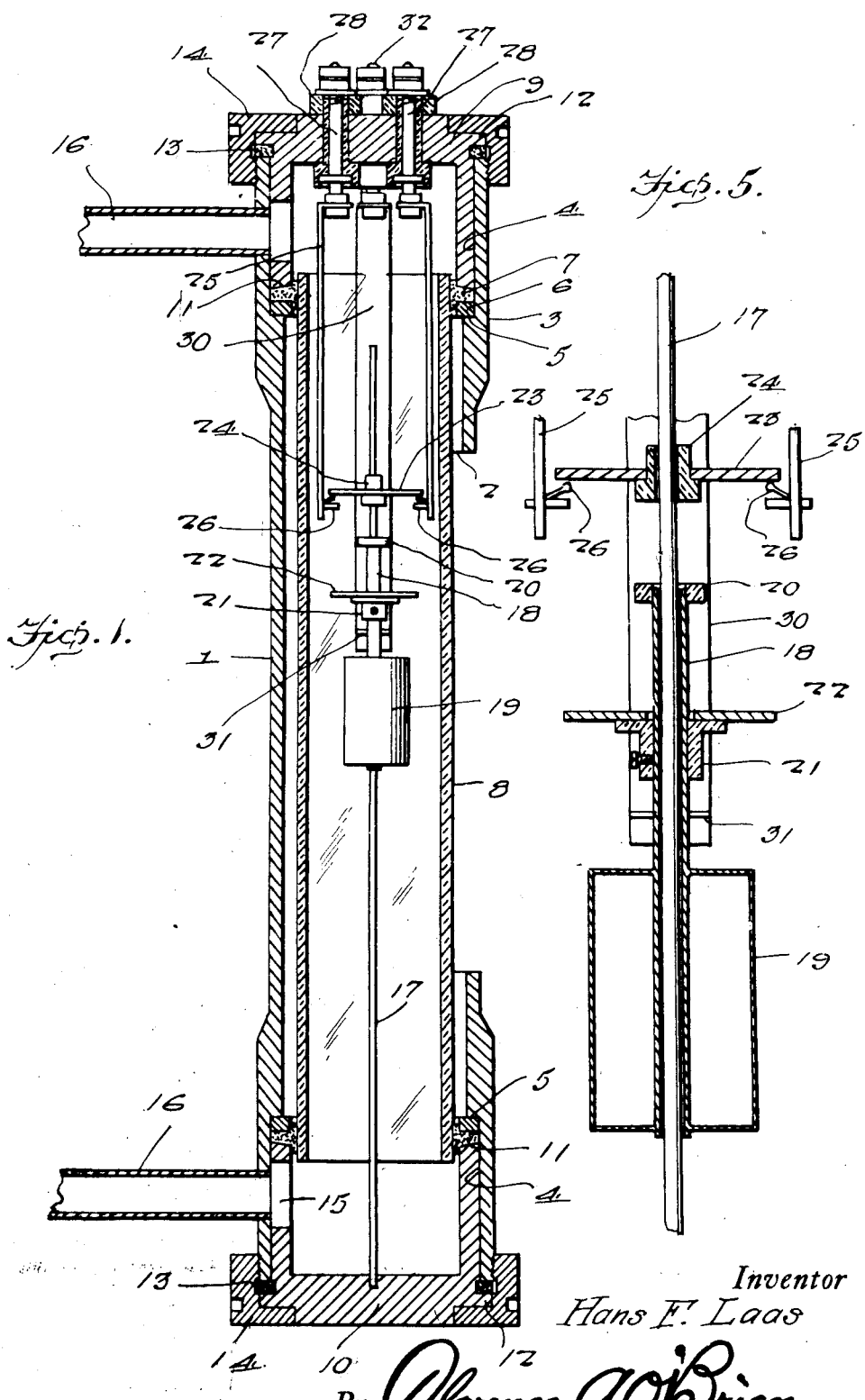

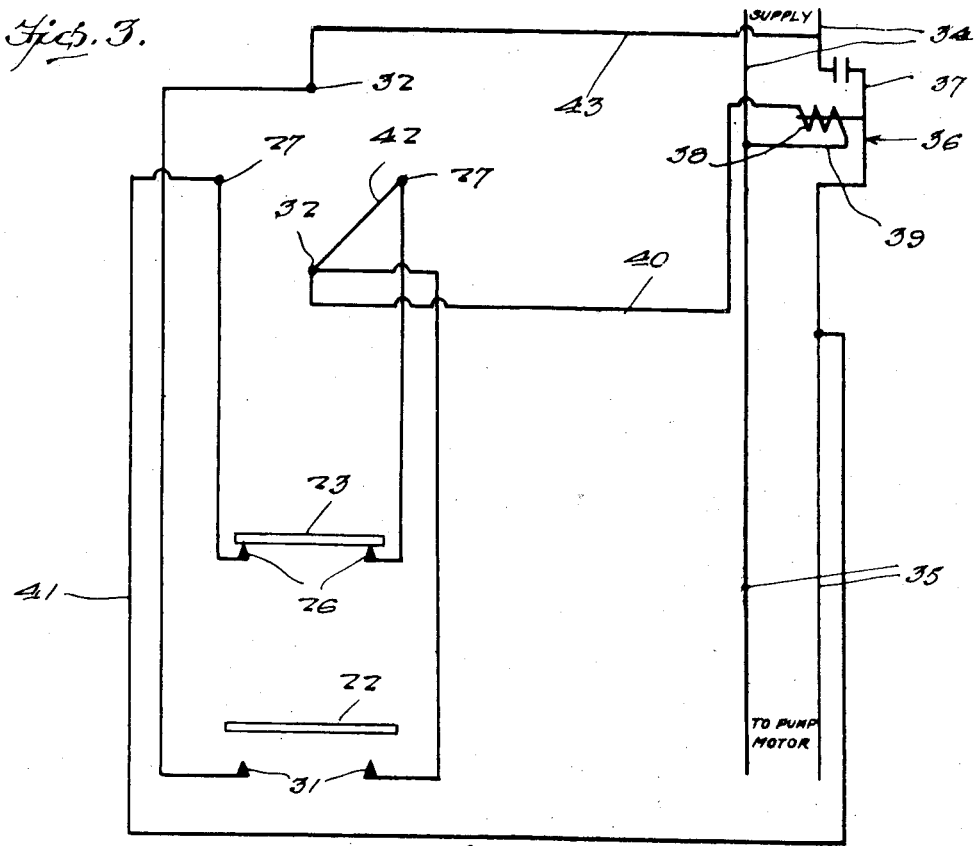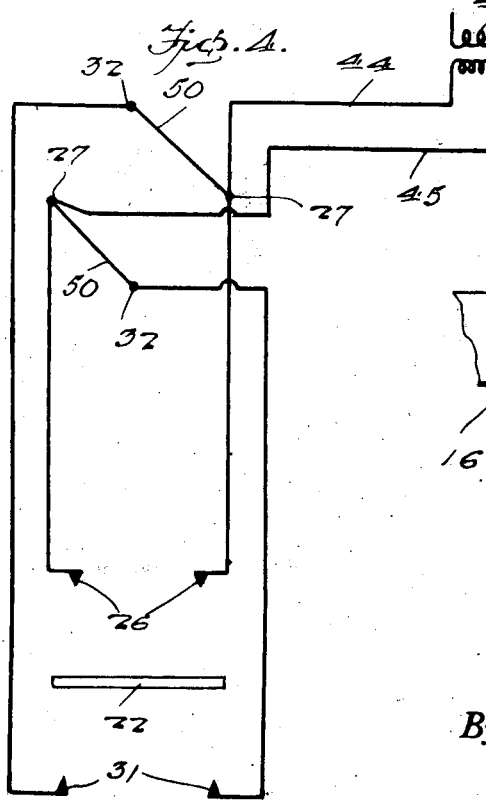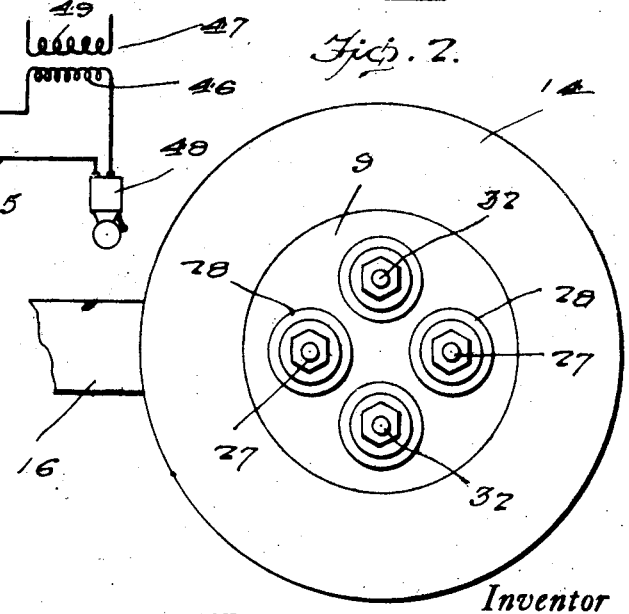

1,718,241

UNITED STATES PATENT OFFICE.

HANS F. LAAS, OF ST. PAUL, MINNESOTA.

AUTOMATIC CONTROLLER FOR BOILER WATER SUPPLY.

Application filed November 29, 1926. Serial No. 151,535.

This invention relates to means for automatically controlling the supply of feed water to a boiler which will operate automatically under the variation of the water level in the boiler through the operation of suitable electrical means to maintain the water level in the boiler above a predetermined point.

An object of the invention resides in providing an electric control means having a suitable actuating element combined with a gauge glass structure for a boiler and operable therein for automatically controlling electric circuits in accordance with the level of the water in the boiler to operate a feed water pump or suitable feed water apparatus for feeding water to the boiler operable to maintain the same above a predetermined level automatically.

A further object of the invention resides in providing an improved construction of boiler gauge embodying a main controlling element for the automatic feed water controlling mechanism, having a novel assembly of parts which are of relatively simple structure, having a special association in assembled relation and permitting the easy assembly and detachment of parts.

The invention comprehends numerous other objects and improvements residing in the system of control and the controlling apparatus which are pointed out more particularly in the following description and claims directed to the preferred form of the invention, it being understood however, that various changes may be made without departing from the spirit and scope of the invention as herein set forth.

In the drawings forming part of this application:—

Figure 1 is a vertical sectional view through the improved control mechanism,

Fig. 2 is a plan view thereof,

Fig. 3 is a wiring diagram showing the association of circuits for the automatic control of feed water, Fig. 4 is a diagrammatic view of the wiring connection for an alarm mechanism.

Fig. 5 is an enlarged vertical sectional view through the circuit controlling apparatus shown in Fig. 1.

1 indicates the gauge housing in the form of a tubular member having the central portion cut away at one side as indicated at 2 while the end portions are formed with enlarged heads 3. The end portions 3 of the gauge housing are each formed with enlarged bores indicated by the numeral 4 to provide the shoulders 5 against which seats the retaining rings 6 for packing 7 which is compressed and expanded inwardly to engage the opposite end of the gauge glass 8 as illustrated in Fig. 1 for supporting said gauge glass in the gauge housing in liquid-tight relation. In accomplishing this result, a pair of end pieces which are hereafter referred to as the upper end piece 9 and the lower end piece 10 are of substantially similar construction having beveled ends 11 adapted to engage the packing 7 for expanding it inwardly to seat against the outer surface of the end portion of the gauge glass 8.

Each of these end pieces 9 and 10 are provided with annular flanges 12 adapted to seat against the free end of the housing 1 for compressing the packing 13 against the ends of said housing for sealing the joint between the end piece and the housing. Suitable retaining rings 14 are threadedly mounted on the ends of the housing as shown in Fig. 1, and engage the end pieces 9 and 10 respectively for securing the same in liquid-tight relation and in assembled relation with the housing. These end pieces 9 and 10 are formed with openings 15 which are adapted to register with openings in the end portions of the gauge housing which receive and mount the connecting pipes 16, serving to mount the gauge structure on the boiler and which have the opposite ends thereof suitably secured to the boiler and communicating with the interior thereof in the same manner as gauge glasses now used and well known in the art, as a result of which it is believed unnecessary to show the mounting for the pipe 16 on the face of the boiler.

A guide rod 17 is suitably mounted in the lower end piece 10 and extends axially through the gauge glass 8 as shown in Fig. 1, sliding mounting on the upper end thereof the sleeve member 18 carrying at its lower end the float 19. The upper end of the sleeve 18 carries the operating collar 20 formed of suitable insulating material threaded mounted on the upper end of the sleeves 18 while between the float 19 and the collar 20 the flanged insulating sleeve 21 supports the contact disk 22 in insulated relation with respect to the sleeve 18.

This contact disk 22 is hereafter referred to as the lower contact disk while an upper contact disk 23 is mounted on the supporting collar 24 of suitable insulating material slidable on the guide rod 17. The collar 24 is adapted for engagement by the collar 20 on the sleeve 18 in the operation of the sleeve on the guide rod through the movement imparted thereto by the float and the rise or fall of liquid level in the gauge glass.

A pair of contact rods 25 are mounted in spaced parallel relation within the housing 1 and extend in spaced relation at diametrically opposite points into the gauge glass 8 as shown in Fig. 1, and have terminals 26 at their lower ends which extend into the path of movement of the upper contact disk 23 for engagement thereby as the sleeve 18 moves downwardly with the float permitting the downward movement of the upper disk 23 which is limited by the engagement with the terminals 26. The upper ends of these rods 25 are formed with lateral extensions secured to the binding posts 27 mounted in suitable insulating sleeves 28 extending through and secured in the upper end piece 9, so that suitable electrical connection may be made with an external circuit for control by the contact disk 23 in accordance with its cooperation with the terminals 26 on rods 25.

Another pair of contact rods 30 of similar construction to the rods 25 are mounted in a plane at substantially right angles to the plane of the contacts 25 and extends diametrically in relation within the gauge glass 8, terminating below the ends of the contact rods 25 as shown in Fig. 1, which carry terminals 31 positioned below the normal position of the lower contact disk 22 and adapted for circuit controlling cooperation therewith.

The upper end of this pair of contact rods 30 are secured to suitable binding posts 32 mounted in the upper end piece 9 in the same manner as the binding post 27.

Referring particularly to Fig. 3, the circuits for the control system are indicated which include a supply circuit having a pair of wires indicated at 34 adapted for circuit connection with the wires 35 to the motor circuit for a pump operated by an electric motor of any suitable type which is connected to the boiler for supplying feed water thereto. The circuit is controlled by means of the circuit breaker 36, having a movable arm 37 thereof controlling the connection of the supply wires 34 with the motor circuit 35 which is closed by the electro-magnetic coil 38. This coil 38 has a connection 39 with one side of the supply circuit as shown in Fig. 3 while the other terminal of the coil 38 has a wire 40 connecting it in circuit with one of the binding posts 27 for the contact rods 25 while the other contact rods have a circuit connection with the other binding posts 27, indicated by the wire 41 which extends and is connected to the circuit wire 35 for the proper side of the circuit to form a return for the circuit through the coil 38. This circuit is de-energized when the movable contact 37 of the circuit breaker is in the open or circuit breaking position.

A connection 42 is made between the binding post 27 receiving the circuit connection 40 and one of the binding posts 27 to establish a circuit for the coil 38 with one of the contacts 31 which is closed by the control contact disk 22, while the other binding post 30 for the pair of contact rods 30 is electrically connected by the wire 43 with the opposite side of the supply circuit 34 from the wire connection 39.

With this circuit arrangement it will be seen that when the water level in a boiler or other device to which this gauge mechanism above described is attached, reaches a certain low lever, the float 19 will move downwardly with the level of the water until the lower control disk 22 engages and bridges the contact 31 on the contact rods 30, thus closing the circuit to the coil 38 and the source of supply carried by the wires 34. This will operate the circuit breakers to close the circuit to wires 35 of the motor pump which will result in the supply of feed water to the boiler, so as to raise the level therein which will raise the float 19. As soon as the circuit for the coil 38 is closed by the contact disk 22, it will be obvious from an inspection of Fig. 3, that the circuit thru the contact disks 23 is also closed which forms a quick circuit for the electro-magnet 38 adapted to retain the circuit breaker in closed position until the pump has operated to supply a sufficient quantity of water to the boiler.

As the water rises in the boiler, it will correspondingly rise in the gauge glass 8 and move the float 19 upwardly so that the lower contact disk 22 will be moved upwardly and out of engagement with respect to the terminals 31 or contact rods 30, thereby breaking the circuit serving to start the operation of the motor. The circuit, however, is maintained closed between the motor and the source of power by the quick circuit controlled by contact disk 23 until the float 19 moves upwardly so that the operating collar 20 engages the collar 24, and in a further upward movement of the float 19, the contact disk 23 will be moved upwardly and become disengaged from the terminals 26.

When the float reaches the position that it moves the upper contact disks out of engagement with the terminals 26, both circuits through the electro-magnet 38 for the circuit breaker become de-energized from permitting the arm 37 to move to the open position, breaking the circuit to the motor through the wires 35 and thereby stopping the operation of the pump and limiting the amount of feed water pumped into the boiler. After this operation of the apparatus, it will be appreciated that as the level of water in the boiler becomes lower, the quick circuit will be first closed and due to the motor circuit being open through the circuit breaker, it will be maintained open by the circuit breaker, in order that the motor will not operate until the circuit controlled by the lower contact 26 is closed as above described, for energizing the electro-magnet 38 to operate the circuit breaker or arm 37.

The construction shown in Fig. 1 may be utilized if desired as an alarm control mechanism for high and lower water level in the boiler through the use of the circuit connections illustrated diagrammatically in Fig. 4, in which only one contact disk is used as illustrated by the diagram in this figure. For this purpose, the upper contact disk 23 is removed from the guide rod and the lower contact disk 22 controls the alarm circuit by cooperation with both pairs of contacts. For this purpose, the pair of contact rods 25 have the binding posts 27 thereof connected to the circuit wires 44 and 45 respectively, which include the secondary 46 of the transformer 47 and the bell or other suitable alarm 48 in series in the circuit with the wires 44 and 45.

The primary 49 of the transformer is suitably connected to a source of alternating currents, as a result of which the proper step-down of voltage is obtained for operating the bell 48 when the contact disk 22 engages the terminals 26 of the contact rods 25. This circuit connection for the bell forms an alarm for the high water level in the boiler, while the pair of contact rods 30 are connected in parallel with the pair of rods 25 through the wire connections 50 joining the binding posts 32 and 27 in the manner illustrated in Fig. 4.

It will thus be seen that the contact disk 22 moves downwardly with the float that the lower level of water in the boiler which will be determined by the positioning of the apparatus on the boiler, will be indicated when the disk engages the terminals 31 again closing the circuit to the bell 48 for signalling the low level of the water.

It will thus be clear that a new and novel construction embodied in a water gauge construction including a float operated contact mechanism has been provided by the present invention for controlling a suitable system of electrically operated apparatus as above described, to automatically maintain a predetermined level of feed water in a boiler or indicate when a maximum or minimum level of water obtained in the boiler in its normal operation.

Having thus described my invention, what I claim as new is:—

1. A float controlled circuit closer comprising a float guide having a float slidably arranged thereon, a plurality of pairs of stationary electric contact members disposed above the float and connected in circuit with the source of power for controlling said circuit, and a plurality of movable contacting members disposed in contacting position with their respective stationary contact members when said float is disposed at a predetermined level and operable by the movement of the float to successively move said movable contact members out of contacting position.

2. A float controlled circuit closer comprising a float guide having a float slidably arranged thereon, a plurality of pairs of stationary electric contact members disposed above the float and connected in circuit with a source of power for controlling said circuit, a contact disc slidably carried on the guide rod independent of the float and operable thereby and normally engageable with certain of said contact members when said float is disposed at a predetermined position on the guide, and a contacting disc mounted for operation on the float whereby to permit limited independent movement thereof and engageable with the other of said stationary contacts upon the disposition of the float in its lowermost position and movable by the float out of contact position in advance of said first named disc.

In testimony whereof I affix my signature.

HANS F. LAAS.